US005898044A

United States Patent [19]

Nooren

[11] Patent Number: 5,898,044
[45] Date of Patent: Apr. 27, 1999

[54] USE OF A PREPARATION FOR INSULATION/SEALING AND COATING PURPOSES AND METHOD FOR SEALING MANHOLE COVERS

[76] Inventor: Franciscus Petrus Nooren, Gasselterstraat 24, NL-9503 JB Stadskanaal, Netherlands

[21] Appl. No.: 08/672,670

[22] Filed: Jun. 28, 1996

[30] Foreign Application Priority Data

Jun. 30, 1995 [NL] Netherlands ............................ 1000712

[51] Int. Cl.$^6$ .............................. B32B 5/16; B32B 27/00; E02D 29/14; H02G 9/00
[52] U.S. Cl. ...................... 428/323; 428/36.9; 428/36.92; 428/209; 428/332; 428/450; 428/462; 179/37; 179/39; 404/25; 404/26
[58] Field of Search ................................ 428/36.9, 36.92, 428/209, 323, 332, 450, 462; 174/250–260, 37, 39, 138 C, 137 B, 110 B, 110 S, 110 SR, 110 F; 439/67–77; 361/792–795, 748–751, 780; 404/25, 26

[56] References Cited

U.S. PATENT DOCUMENTS

| 4,094,911 | 6/1978 | Mitsch et al. ............................ 568/615 |
| 4,189,942 | 2/1980 | Giezen et al. ............................ 428/462 |
| 4,475,845 | 10/1984 | Odill et al. ................................ 404/25 |
| 4,621,941 | 11/1986 | Ditcher et al. ............................ 404/26 |
| 4,661,397 | 4/1987 | Kwiecinski et al. .................... 428/450 |
| 4,834,574 | 5/1989 | Bowman .................................... 404/26 |
| 4,962,151 | 10/1990 | Mellon ..................................... 524/788 |
| 5,143,219 | 9/1992 | Yates, Jr. ................................. 206/508 |
| 5,679,457 | 10/1997 | Bergerson ............................... 428/450 |

FOREIGN PATENT DOCUMENTS

| 0 024 882 | 3/1981 | European Pat. Off. . |
| 0-244-738 | 4/1987 | European Pat. Off. . |
| 0 366 969 | 5/1989 | European Pat. Off. . |
| 0-359-273 | 3/1990 | European Pat. Off. . |
| 2-256-231 | 12/1974 | France . |
| 2-393-831 | 6/1977 | France . |
| 2-100-478 | 1/1971 | Germany . |
| 23 61 911 | 6/1975 | Germany . |
| 38 24 485 | 1/1990 | Germany . |
| 55016163 | 7/1998 | Japan . |
| 2106307 | 4/1983 | United Kingdom . |
| 2-283-185 | 10/1993 | United Kingdom . |
| WO 91/08253 | 6/1991 | WIPO . |

*Primary Examiner*—Peter A. Szekely
*Attorney, Agent, or Firm*—Gilberto M. Villacorta; Pepper Hamilton LLP

[57] ABSTRACT

The invention relates to the use of a preparation for insulation/sealing and coating purposes, comprising an apolar, non-setting fluid polymer having a glass transition temperature lower than −60° C., wherein the polymer has a surface tension of less than 40 mN/m above the glass transition temperature. Preferably, the preparation contains one or more fillers having a different particle size and a different particle size distribution.

19 Claims, No Drawings

USE OF A PREPARATION FOR INSULATION/SEALING AND COATING PURPOSES AND METHOD FOR SEALING MANHOLE COVERS

The invention relates to the use of a preparation for insulation/sealing and coating purposes, comprising an apolar, non-setting, fluid polymer having a glass transition temperature lower than −60° C., and a method for sealing manhole covers. The invention relates in particular to the use of a preparation for insulating and sealing underground objects which are in contact with moisture or water, for example underground steel manhole covers, underground tanks, lines, pipes and cable sleeves.

U.S. Pat. No. 4,094,911 discloses that linear poly (perfluoroalkylene oxide) with functional end groups, which has a glass transition temperature lower than −78° C. and a number average molecular weight of 500 to 20 000, can be used as insulating material.

European patent Application 0 359 273 relates to polyurethanes comprising rubber-like polyoxyperfluoroalkylene blocks and rigid elements, which are derived from compounds having a low molecular weight and from (cyclo) aliphatic or aromatic diisocyanates. Said polyurethanes have a glass transition temperature lower than −80° C. Said polymers can be used, for example, as insulating material and sealing means.

Manhole covers are covers for manholes, which are openings in, for example, above- or below-ground steel or concrete storage chambers for liquids and gases, such as LPG tanks, boilers, cesspits and rainwater tanks. Said openings are of a size such that a person is able to pass through them.

Manhole covers, underground tanks, lines and the like are made of metal and therefore show a tendency to corrode. This corrosion is undesirable since it weakens the metal. That is why attempts are made to counteract or to prevent this formation of corrosion.

Various techniques and preparations are known for counteracting or preventing corrosion formation. For instance, lines and pipes of underground tanks, for example LPG tanks, are protected with the aid of so-called cathodic protection. This technique comprises the application of a low voltage to the tank or to the lines which are connected to the tank, as a result of which electrochemical reactions which lead to the formation of corrosion are not able to occur. However, this technique has a number of disadvantages. In addition to the continuous consumption of power, which is economically unattractive, there is a risk that the system will fall as a result of, for example, power disruptions. Moreover, formation of vesicles under the coating of the tank or lines may occur which is caused by decomposition of water into hydrogen and oxygen gas. It is for this reason that preparations are preferably used to seal or insulate such lines and tanks, although the preparations according to the prior art frequently also give rise to problems.

For sealing, for example, manhole covers, use is made not only of bitumen but also, for example, of preparations which contain synthetic, thermosetting resins, for example epoxy or polyurethane resins. These preparations have the disadvantage that a hard coating or seal is produced. This hard seal can easily split or tear under the influence of, for example, mechanical stresses. Another disadvantage of these preparations is that solvents are needed for their application. Following the application of the preparation, these solvents will evaporate, as a result of which a microporous seal or coating is produced, which is partially permeable to water. Water is therefore able to penetrate through this coating, with the result that corrosion formation occurs. The situation also arises that once the water has penetrated through the protective layer, the protective layer crumbles away as a result of the osmotic pressure (polar substances such as salts are not able to penetrate through the protective layer), with the consequence that the manhole cover is no longer adequately protected. Yet a further disadvantage of these preparations is that they are difficult to remove, which, for example, can be necessary in the case of repairs. It is therefore difficult to clean the surface of the manhole cover to be sealed, as a result of which the application of a fresh layer leads to mediocre sealing of the manhole cover.

Bitumen-containing materials are also partially permeable to water and in general do not meet the requirements laid down by the KIWA (Keuringsinstituut voor Waterleidingartikelen; Dutch Inspection Institute for Water Supply Articles). As bitumen are characterised by having a glass transition temperature more than about 10° C., removal of bitumen is difficult during the summer and formation of cracks in the bitumen layer may occur during the winter.

Preparations which contain synthetic, thermosetting resins are also used for sealing cable sleeves. In these sleeves as well splitting and tearing can occur, for example as a result of mechanical stresses, for example road traffic, earth movements and the like, with the consequence that water is able to penetrate into the cable sleeve and that the cables contained therein are no longer adequately protected. Another problem which arises when sealing cable sleeves with preparations of this type is that once cable sleeves have been sealed said sleeves have to be replaced or additional cable sleeves have to be applied to make new branches.

It is clear from the above that many problems can arise when the techniques and preparations according to the prior art are used. The present invention provides a solution to these problems by using a fluid material instead of setting materials. Said fluid materials have a better seating on the article to be sealed or to be insulated, as well as better deformability and very good adhesion, that is to say a good adhesive power to the surface. The preparation according to the invention is therefore also kneadable and simple to apply and to remove using a trowel. A clean surface is left behind on removal. The preparation according to the invention does not set and therefore remains soft and is also not permeable to water and is pore-tight. No additional adhesive means are required for the application of the preparation according to the invention to the surface to be sealed or to be protected. The invention therefore also relates to the use of a preparation as described in the preamble, characterised in that the polymer has a surface tension of less than 40 mN/m above the glass transition temperature.

Polymers having a glass transition temperature lower than −20° C. have the advantage that when these are used in the preparations according to the invention they have good deformability and remain soft within the temperature range in which the preparations are used, because the polymers are in the rubber-like state. Polymers which have a surface tension of less than 40 mN/m at 20° C. have the advantage that when they are used in the preparation according to the invention good adhesion to the surface to be sealed, to be insulated or to be protected is obtained. Such polymers, which are suitable for use in the preparations according to the invention, comprise apolar, non-setting fluid polymers. Such polymers are known in the prior art, for example polyalkanedienes, polyalkenes and polysiloxanes.

It is advantageous to use preparations which comprise apolar, non-setting, fluid polymers which have a glass transition temperature lower than −60° C. and a surface tension of less than 40 mN/m at 20° C. Polymers of this type are likewise known in the prior art and comprise, for example, polyalkanedienes, polyalkenes and polysiloxanes. Examples of suitable polyalkanedienes are polyisoprene, poly(1-butylene), poly(1-pentylene), poly(1-ethyl-1-butylene), poly (1-butyl-1-butylene) and poly(1-heptyl-1-butylene). An example of a suitable polyalkene is polyisobutene. Examples of suitable polysiloxane are poly (oxydimethylsilylene)(=polydimethylsiloxane) and poly (oxymethylphenylsilylene). Polyisobutene and poly (oxydimethylsilylene) are preferably used. Therefore, according to the invention a preparation is preferably used which comprises apolar, non-setting, fluid polymers, wherein the polymers have a glass transition temperature lower than −60° C.

The molecular weight of suitable polymers can vary over a wide range. The molecular weight of, for example, suitable polyalkenes can be, for example, 500 to 100 000. Suitable polyalkenes have a viscosity at 100° C. of approximately 10 to 50 000 cSt. The density of suitable polyakenes lies approximately between 0.75 and 1.10, preferably approximately between 0.85 and 0.95, the bromine number (g $Br_2$/100 g) approximately between 0.1 and 50, the acid number (mg KOH/g) approximately between 0.01 and 0.05 and the specific electric resistance at 100° C. is preferably greater than $10^{12}$ Ω.cm.

Suitable polysiloxanes (polyoxysilylenes) are, for example, those which at 25° C. have a density of approximately 0.75 to 1.10, preferably of 0.90 to 1.00, a surface tension of less than 35, preferably less than 25 mN/m, an acid number of approximately 0.01 mg KOH/g and a specific electric resistance according to the standard DIN 53482 of greater than $10^{12}$ Ω.cm.

According to the present invention, polymers comprising polyisobutene and/or poly(oxydimenthylsilylene) which have a viscosity of between 60 000 and 1 200 000 cSt (60 to 1200 Pa.s) at 20° C. are advantageously used.

The preparation according to the invention is able to withstand many chemical substances. For instance, the preparation is able to withstand water-containing solutions of inorganic and organic substances such as salts, acids and bases, for example solutions of hydrochloric acid, sulphuric acid, phosphoric acid, chlorosulphonic acid, potassium hydroxide, sodium hydroxide, potassium bichromate, acetic acid, organic solvents, for example benzene, and corrosive gases, such as ammonia.

The preparation according to the invention can also contain stabilising agents, for example agents against oxidation under the influence of heat, such as 2,6-di-t-butyl-4-methylphenol, and agents against the action of ultraviolet light.

The preparation according to the invention can contain one or more fillers. Said fillers can be of organic or inorganic nature. Examples of inorganic fillers are polyvinyl chloride, polyethene, polypropene, polyisoprene and rubber. Examples of inorganic fillers are inorganic minerals, salts and oxides, for example chalk, boron sulphate, aluminium oxide, silicon dioxide, ground quartz, glass, talc, slate, bentonite and the like. Preferably, a mixture of coarse and fine particles, in a specific mixing ratio, of one or more fillers is used. The rheological characteristics of the preparation according to the invention can be controlled by means of the amount of filler. According to the invention, it is therefore preferable that the fillers comprise one or more fractions, each fraction having a different particle size and a different particle size distribution. In particular, the fillers comprise at least one fraction having a particle size of 0.1 μm to 1500 μm.

The fillers can be swellable or non-swellable, that is to say they increase substantially or slightly in volume as a result of the absorption of water. One example of a swellable filler is bentonite. The preparation according to the invention can therefore contain one or more polymers having a low molecular weight and/or a high molecular weight and one or more non-swellable and/or swellable fillers.

The fillers can have a low or a high density. The density of the fillers can be between approximately 0.1 and 5 kg/dm$^3$. Examples of a filler having a low density, for example between approximately 0.3 and 0.1 kg/dm$^3$, are so-called "hollow spheres", which, for example, are produced from glass, polyvinylidene chloride or syndiotactic foams, and cork. Examples of fillers having a high density, for example a density of between 2 and 4 kg/dm$^3$, are inorganic fillers such as talc and chalk.

The preparation according to the invention can also contain one or more products which optionally have been obtained directly from petroleum. Examples of such products are bituminous products and paraffin-like products, for example petroleum gel and wax.

The preparation according to the invention is very suitable for sealing manhole covers, which may or may not be underground. Materials which are used for sealing manhole covers must meet a number of conditions. For instance, the specific electric resistance must be high and, according to Netherlands Guideline NPR 6912, the current density of such materials must be less than 100 μA/m$^2$, preferably less than 10 μA/m$^2$. Therefore, according to the invention a preparation is preferably used which has an infinitely high electric resistance and a current density of less than 10 μA/m$^3$, in particular of less than 1 μA/m$^3$.

When a preparation is used for the application as described above, for example the sealing of manhole covers, the preparation must not be porous. If pores are present, these can fill with water in the course of time, as a result of which the sealing and insulating properties of the preparation become poorer, which is reflected in an increased current density. This effect will be more pronounced when the water contains an electrolyte, for example an inorganic salt, such as sodium chloride. It is therefore preferable that a material is used which is pore-tight, that is to say that the material contains relatively few to no pores. Therefore, according to the invention a preparation is preferably used which has a current density of less than 10 μA/m$^2$ when the preparation is in contact with a water-containing containing electrolyte which has a specific resistance of 100 Ω.m.

Materials which are used to seal manhole covers must comply with the standard NEN 6910. For assessment of the pore density, these materials are spark-tested. According to the standard NEN 6910, the spark length must be at least 1.5 times the thickness of the layer of the material applied. Therefore, according to the invention a preparation is preferably used which has a pore density such that a spark having a length of 45 mm is not able to bridge a layer of the preparation which has a thickness of 30 mm, in particular of 16.5 mm.

The preparation according to the invention is deformable, even long after it has been applied. Because the preparation is and remains deformable and it has a paste-like to rubber-like appearance, it is therefore capable of absorbing vibration and shocks. Thus, in addition to the sealing effect, it also provides protection against mechanical effects, such as vibrations, with the result that damage to the article to be sealed will occur less rapidly. The preparation is not sensitive to low temperatures such as can occur during the winter months. In contrast to bitumen, the preparation does not change shape under the influence of temperature. Moreover, the preparation is not hazardous to the user, that is to say it is not toxic and does not release toxic substances and it is not irritating to the skin and the eyes. The preparation contains no substances which are harmful to the environment. The preparation adheres to every type of surface, for example surfaces comprising concrete, stone, glass, synthetic materials, such as plastics, and the like. These surfaces can be dry or damp.

For sealing manhole covers the preparation is preferably used at a temperature of no higher than 50° C. and no lower than −10° C. For other uses, however, these temperatures may be as low as −30 ° C. and a high as 150° C. the preparation can be filled into cartridges or tubes or into larger containers such as buckets. The preparation can therefore be applied easily using a so-called mastic gun, a plunger pump, a trowel, a spatula or a knife. The tools which are used can be cleaned easily using natural or synthetic soap and water.

The preparation according to the invention is therefore suitable for sealing cable sleeves, underground lines and pipes and also tanks and manhole covers according to the standard NEN 2768. The preparation according to the invention is, in particular, suitable for sealing manhole covers. For this purpose, a layer of at most 30 mm of the preparation is applied around the manhole cover.

The preparation according to the invention is also suitable for providing protection against mechanical effects from the outside, such as vibrations and shocks. In particular, the preparation according to the invention can be used to damp sound vibrations which have a frequency of 25 to 25 000 Hz. The preparation according to the invention can therefore advantageously be used for insulating, for example, machines, building, loud-speaker cabinets and the like.

The preparation according to the invention is also suitable as an anti-corrosion agent for welding joints and connectors for both underground and above-ground pipelines and gas lines, for flanges, crane hooks, thermit weldings in divisible shafts below the ground level and in T-joints.

The preparation can also advantageously be used to protect sensitive electronic apparatus, for example electronic measurement and control apparatus and electronic apparatus for sound recording and reproduction, against moisture, dust and gases, for example corrosive gases.

The preparation according to the invention can also be used for the insulation of above-ground and/or underground components which are used in the electricity generating and consuming industries, for example low- and high-voltage cables and connectors, and for the protection thereof against moisture and gases, for example corrosive gases.

The preparation according to the invention can furthermore be used in combination with specific types of tape or in combination with mats. The tape or the mats can be made of a butyl rubber, polyurethane, polysulphide, polyvinyl chloride, polyethene and the like. The width of the mat or tape can be 2 cm to 2 m. For an application of this type, an approximately 0.1 to approximately 2 cm layer of the preparation according to he invention is applied to the mat or tape. Mats or tapes of this type are, in particular, suitable for the provision of mechanical strength and/or for improving the chemical resistance of the article to which the mat or tape is applied. The combination mat/preparation is also suitable to be sued as roofing material and as a substitute for textile materials, e.g. those which are used in the automobile industry.

The preparation according to the invention may also be sued in combination with means such as shrink sleeves, tapes and belts, geofabrics, mats and mats and tapes having an open cel structure. These means may be used to impart mechanical strength to the preparation. These combination can be wrapped around welded joins of two joined tubes and flanges or other objects to be sealed for prohibiting corrosion. The combination shrink sleeve/preparation may be used as follows. A shrink sleeve is mounted around one of the tubes and the tubes are welded together. The preparation is applied to the welded joint after the welded joint has cooled to e.g. room temperature. The shrink sleeve is then moved over the welded joint so as that between the joint and the sleeve a layer of the preparation is present, said layer having a thickness of about 0.1 to 2 cm. After heating the shrink sleeve a completely sealed seal is obtained and the welded joint is completely protected from moisture, dust and gases.

The mats described above can also be used in shipbuilding for covering very large surfaces. For an application of this type the mats can be up to 4 m wide. Such mats are, in particular, suitable for covering metal objects on the inside of ships.

The preparation according to the invention can furthermore be used as such as ship-building and in the offshore industry, for example for protecting the legs of drilling platforms, and steel components and pipes located under seawater.

The suitability of the preparation according to the invention for sealing, in particular, underground steel manhole covers has been determined in a number of tests. It has also been demonstrated in these tests that better and more durable sealing of manhole covers is obtained with the use of the preparation according to the invention than with the use of the materials according to the prior art. The following experiments were carried out on the preparation that had been applied two years previously to manhole covers in a petrol station. The preparation according to the invention also complies with the standard NEN 2768.

The invention will now be further illustrated by the following examples which are not considered as limiting or restrictive.

EXAMPLE I

In order to determine the environment around the manhole cover that had been sealed using the preparation according to the invention, soil samples of the packing sand alongside the manhole cover were taken. The specific electric resistance of the packing sand in the dry state is about 1000 $\Omega$.m and in the wet state about 500 $\Omega$.m. This means that the packing sand complies with the CPR 8.1 guideline and is thus of high quality. The specific electric resistance of this packing sand has a preventive action against corrosion.

The metal-electrolyte potential $V_{in}$ and the associated current density of a tank body which had not been dug free were determined (Experiment 1, Table 1). The metal-electrolyte potential is the voltage difference between a metal object (this is the tank in this experiment) in an electrolyte and a measurement electrode which is in contact with the electrolyte. The measurement electrode comprises a galvanic half-cell, consisting of a copper rod in a saturated solution of copper sulphate. The metal-electrolyte potential was measured as such and immediately after switching off the protective current. The protective current is a current supplied to the metal object by a galvanic sacrificial anode, which is made of a metal which is less noble than the metal from which the object is made, or by an external current source, and which neutralises the potential differences at the metal's surface. The measurement in the absence of the protective current provides the true potential of the metal object $V_{out}$, which is lower than the metal-electrolyte potential in the presence of a protective current. This reduction is caused by the current which flows through the electric circuit.

The metal-electrolyte potential was also determined after the risers of the tank had been dug free (Experiment 2) and after the manhole cover had been dug free (Experiment 3).

TABLE 1

| Experiment | $V_{in}$ (mV) | $V_{out}$ (mV) | I ($\mu$A) |
|---|---|---|---|
| 1 | 1520 | 820 | 45.0 |
| 2 | 1520 | 820 | 40.0 |
| 3 | 1520 | 820 | 40.0 |

These experiments show that the specific electric resistant of the preparation is infinitely high.

EXAMPLE II

The current density of the preparation was also determined in the above experiment. It was found that in a high-ohm environment the current density was approximately 0 $\mu$A/m$^2$.

EXAMPLE III

The pore density of the preparation was determined with the aid of DC sparking equipment in accordance with the standard NEN 6910. The specification for a bitumen coating on the manhole cover is that no arc-over may occur when the spark length is 1.5 times the thickness of the layer applied (this approximately corresponds to a voltage of 4.5 kV per mm layer thickness). It was found that with a spark length of 45 mm no arc-over occurred with layer thicknesses of 30 mm and did not occur even with layer thicknesses of 16.5 mm.

EXAMPLE IV

The pore density of the preparation was also determined in another experiment. The manhole cover from Example I was steeped with an electrolyte-containing solution which had a specific electric resistance of 100 $\Omega$.m. That is to say the cavity dug out, in which the manhole cover is located, is filled with the electrolyte-containing water. The metal-electrolyte potential was then determined in the presence and the absence of the protective current, in accordance with the method of EXAMPLE I, it being found that $V_{in}$ was 1520 mV, $V_{out}$ 800 mV and I 50 $\mu$A. This means that even in a damp and aggressive environment the specific electric resistance of the preparation is infinitely high.

EXAMPLE V

In this experiment the adhesion of the preparation to metal was tested. A V-shaped cut was made in the preparation which had been applied to a manhole cover without an additional adhesive and the preparation was removed using a trowel. Traces of the preparation were visible on the metal, which demonstrates that the adhesion was satisfactory. It was also found that the metal surface was not corroded and that no accumulation of water had occurred beneath the preparation.

EXAMPLE VI

The specific resistance of the preparation was also determined in the following experiment.

The preparation was placed in a so-called CIGRE cell and the cell was then heated to 100° C. A direct voltage of 500 V was then applied over the cell and the specific resistance was determined after 5 minutes. The specific resistance was found to be 19*10$^{12}$ $\Omega$.m.

I claim:

1. A shaped article comprising a substrate having on at least one portion of at least one surface a coating composition comprising an apolar, non-thermosetting fluid polymer having a glass transition temperature lower than −20° C. and a surface tension of less than 40 mN/m at a temperature above its glass transition temperature, and a filler comprising a plurality of fractions each comprising different size particles, and wherein said different fractions have different particle size distributions.

2. An article as claimed in claim 1 wherein said composition additionally comprises at least one filler.

3. An article as claimed in claim 2 wherein said filler is selected from the group consisting of organic fillers and inorganic fillers.

4. An article as claimed in claim 1 wherein said filler comprises at least one fraction having particle sizes of about 0.1 to 1500 $\mu$m.

5. An article as claimed in claim 1 wherein said composition is adapted to pass current at a density of less than 10 $\mu$A/m$^2$.

6. An article as claimed in claim 5 wherein said composition passes current at a density of less than about 1 $\mu$A/m$^2$.

7. An article as claimed in claim 5 wherein said current density is measured by immersion of said composition in a liquid composition, comprising water and an electrolyte, and having a specific electrical resistance of 100 $\Omega$.m.

8. An article as claimed in claim 1 wherein said composition comprises a foam having a pore density such that a spark having a length of at least 45 mm is not able to bridge a layer of said composition that is at least 16.5 mm thick.

9. An article as claimed in claim 8 wherein said layer has a thickness of 30 mm.

10. An article as claimed in claim 1 wherein said substrate comprises a manhole cover.

11. An article as claimed in claim 1 wherein said substrate comprises electrical equipment.

12. An article as claimed in claim 11 wherein said electrical equipment comprises electrical lines.

13. An article as claimed in claim 12 wherein said electrical lines comprise cable sleeves.

14. An article as claimed in claim 2 wherein said filler comprises swellable filler materials.

15. An article as claimed in claim 1 wherein said substrate comprises at least one member selected from the group consisting of sealing flanges, crane hooks, welded joints, T-joints, and thermit weldings.

16. An article as claimed in claim 15 wherein said thermit welding is of a divisible shaft disposed below ground level.

17. An article as claimed in claim 1 wherein said composition is applied to said surfaces at a temperature of about −30 to 150° C. and said coated substrate is thereafter maintained at about said temperature.

18. An article as claimed in claim 1 wherein said substrate comprises electronic apparatus.

19. An article as claimed in claim 1 wherein said glass transition temperature is lower than about −60° C.

* * * * *